E. WEINTRAUB.
APPARATUS FOR THE TREATMENT OF REFRACTORY MATERIALS.
APPLICATION FILED NOV. 12, 1907. RENEWED JAN. 31, 1910.
997,881.
Patented July 11, 1911.
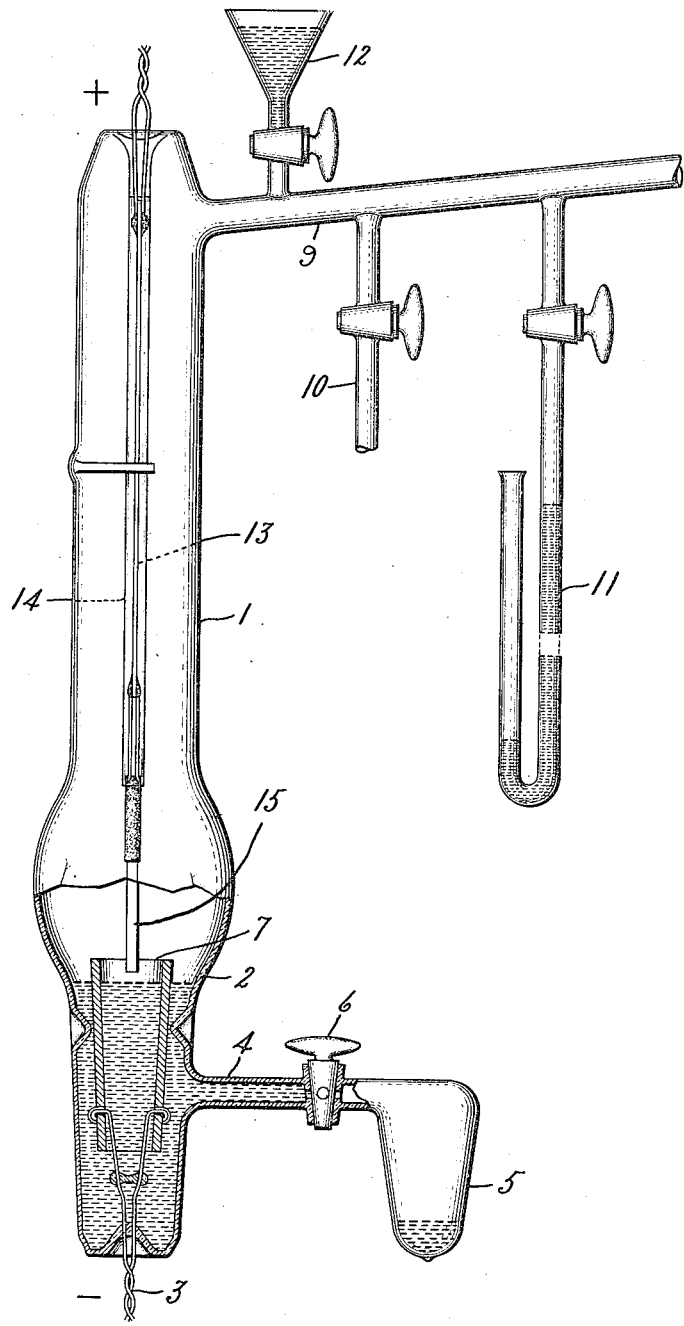
Witnesses:
George H. Tilden
J. Ellis Glen.
Inventor:
Ezechiel Weintraub,
by Albert G. Davis
Att'y.

UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

APPARATUS FOR THE TREATMENT OF REFRACTORY MATERIALS.

997,881.   Specification of Letters Patent.   Patented July 11, 1911.

Original application filed December 4, 1906, Serial No. 346,253. Divided and this application filed November 12, 1907, Serial No. 401,811. Renewed January 31, 1910. Serial No. 541,155.

*To all whom it may concern:*

Be it known that I, EZECHIEL WEINTRAUB, a citizen of the United States, residing at Schenectady, in the county of Schenectady, State of New York, have invented certain new and useful Improvements in Apparatus for the Treatment of Refractory Materials, of which the following is a specification.

My present application is a division of one filed by me December 4th, 1906, Serial No. 346,253.

This invention relates to methods of purifying and treating refractory materials and includes a furnace applicable to the fusion of boron and other refractory materials.

The usual method for producing boron includes the reduction of boric anhydrid with magnesium, the general process being to heat a mixture of magnesium with an excess of boric anhydrid. This reaction is accompanied by the production of magnesium borate and by the formation of other compounds. The resultant product, therefore, contains a relatively high percentage of material other than boron. After suitable purification, as by washing and fractional decantation, the material is obtained in a finely divided condition, but relatively impure.

To secure conductive boron from the material above described or from the raw product of the reaction after due purification, I may compress the impure boron above described into the form of a stick or rod, say six centimeters long and five millimeters in cross-section. This stick is then highly heated in a vacuum to dissociate and drive off various of the impurities. For this heating treatment I may conveniently utilize the vacuum furnace described in United States patent to Arsem, No. 785,535, March 21, 1905. This heat treatment dissociates any magnesium borid which may be present and drives off the magnesium. Similarly, it dissociates or volatilizes any boron hydrid. In case any $B_2O_3$ or any borate is present, that also passes off by direct volatilization. The heat treatment may be continued for several hours at a temperature of say 1200° C. without any danger of contaminating the boron by the carbon of the resistance heater used in the furnace above mentioned. I have mentioned the purification of the boron by this heating in the vacuum, but I find that another very important change takes place, and that the stick, which before treatment was a non-conductor, becomes a relatively good conductor of electricity. This surprising result is of great commercial importance, for the boron thus produced is radically different from that described in text books and technical literature. I do not wish to be limited to any particular theory for the conversion of this stick from a non-conductive to a conductive condition, but such is the fact. The next step in my process consists in melting down this conductive boron by heating it as anode in a vacuum arc. The apparatus for carrying out this step is illustrated in the drawing forming part of this specification, and is hereinafter described in detail.

A hermetically sealed envelop 1 of glass is provided at its bottom with a cup-shaped depression 2 capable of holding a suitable quantity of mercury for use as the cathode of a mercury arc. Suitable lead-wires 3 pass through the glass envelop and serve as means for connecting the mercury to a source of energy. A small tube 4 leads out of this cup-shaped depression or cathode chamber 2 into a well 5 which serves as a receptacle into which mercury may be drawn to lower the surface of the mercury cathode as occasion may require. A suitable stop cock 6 is provided for controlling the flow of mercury into this well. A bottomless cup 7 of alumina is secured in the mercury chamber and projects above the surface of the mercury and thereby prevents wandering of the cathode spot over against the side of the glass envelop where it might do damage by excessive heating. The upper end of the glass envelop is connected by a tube 9 with a good vacuum pump, and this tube also communicates through suitable valves with a source of hydrogen 10 or other gas, whereby this gas may be admitted to the arc chamber after the latter has been exhausted. A pressure gage 10 serves to indicate the state of the vacuum within the chamber and a small funnel 12 furnishes a ready means for the introduction of mercury through tube 9 into the main chamber of the furnace. From the top of the furnace chamber 1 depends a rod or wire 13 surrounded by a protective sleeve 14 and supporting at its lower end a carbon tube or sleeve within the end of which is secured one end of a stick or rod 15 of the material to be treated or melted.

To start the apparatus into operation, I exhaust the main chamber 1 and the mercury well 5 by means of the vacuum pump, and I then introduce sufficient mercury through funnel 12 to raise the level in the alumina cup 7 until contact is made with the lower end of the stick 15 to be treated. I next introduce a small quantity of gas inert with respect to the material to be treated, as I have found that this addition concentrates the arc on the lower end of the material under treatment and prevents the tendency which the arc would otherwise have of running to the lead-wire 13, this being particularly the case if the material is of lower conductivity than the lead-wire. Various gases may be introduced to produce this concentration of the arc, and in general I consider that the effect is due to the increased resistance offered to the passage of the arc through the gaseous medium of the envelop, by virtue of which the arc takes the shortest path to the anode and is thereby concentrated on the end thereof. If the stick under treatment consists of boron I may use hydrogen as the gas; and although the quantity may vary considerably, I prefer to use hydrogen at a pressure of from two and a half to fifteen centimeters of mercury.

To start the arc between the mercury cathode and the solid anode 15, I open the stop cock 6 and allow a small quantity of the cathode mercury to flow through into the well 5, and thereby lower the level of the mercury in cup 7. This produces an arc which can be drawn out to the proper length by further subtraction of the mercury from the cathode.

The heating action of the mercury arc is so intense and so concentrated that it fuses down the end of the stick into a bead or globule, and I am thereby enabled to obtain relatively large quantities of pure boron in a compact, homogeneous and thoroughly fused mass.

The standard chemical text books describe boron as being a non-conductive material which vaporizes at high temperatures without melting. Such statements in no wise apply to the boron I have produced as above described, for it is a relatively good conductor of electricity, is a dense and solid body and undergoes complete fusion without apparent vaporization.

In the furnace treatment above described, the introduction of an inert gas to secure concentration of the arc on the anode under treatment furnishes an easy means for treating boron, but is not limited in its application to this one material. It has been found of great utility in the treatment of that general class of refractory materials of which boron is typical, such for instance, as have been produced and are being used in the manufacture of glowers or filaments for lamps and furnaces. I consider that this step in my process is a generic one as applied to the arc treatment of refractory conductors.

In an application, Serial No. 524,948, filed by me Oct. 27, 1909, claims are made on the method of treating refractory material by using it as anode for an arc operating in the presence of an appreciable atmosphere. In another divisional case, Ser. No. 585,391, filed Oct. 5, 1910, claims are made on boron as an article of manufacture.

What 1 claim as new and desire to secure by Letters Patent of the United States, is,—

1. An apparatus for the treatment of material at high temperatures, comprising a hermetically sealed chamber containing a gaseous medium under a pressure sufficient to give a prescribed path to an arc formed therein, a vaporizable electrode in said chamber, means for supporting the material to be treated within said chamber and means for producing an arc from said vaporizable electrode to heat said material.

2. An apparatus for treating material at a high temperature comprising a hermetically sealed chamber, means for supporting the material to be treated within said chamber, a vaporizable electrode in proximity thereto, means for establishing an arc between said electrode and said material, and a gaseous medium for concentrating the heating action of said arc on a limited portion of said material.

3. A furnace for the treatment of refractory material, comprising a hermetically sealed chamber, a mercury electrode within said chamber, means for supporting material to be treated in proximity to said electrode, means for changing the level of said mercury and to establish an arc for heating said material, and means for maintaining an appreciable atmosphere within said container to concentrate the heating action of said arc on a limited portion of said material.

4. A furnace for the treatment of refractory material, comprising a hermetically sealed chamber having an appreciable atmosphere, a mercury electrode within said chamber, means for supporting material to be treated in proximity to said electrode, and an auxiliary chamber into which mercury from said electrode may be drawn to start an arc for heating said material to be treated.

5. A furnace for the treatment of refractory material, comprising a hermetically sealed chamber having an atmosphere sufficient to constrict the cross-section of an arc therein, means for supporting material to be treated in said chamber, a mercury electrode initially contacting with said material, and a valve controlled tube through which a portion of said mercury can be withdrawn to start an arc in said envelop.

In witness whereof, I have hereunto set my hand this 7th day of November, 1907.

EZECHIEL WEINTRAUB.

Witnesses:
  BENJAMIN B. HULL,
  HELEN ORFORD.